No. 751,666. PATENTED FEB. 9, 1904.
I. MAYER & J. HÜBNER.
STOP AND AUTOMATIC CUT-OFF VALVE.
APPLICATION FILED DEC. 22, 1902.
NO MODEL. 2 SHEETS—SHEET 1.

WITNESSES.
Albert Jones
Samuel Percival

INVENTORS.
Isidor Mayer
Joseph Hübner
per Wheatley & Mackenzie
Attorneys.

No. 751,666. Patented February 9, 1904.

UNITED STATES PATENT OFFICE.

ISIDOR MAYER AND JOSEF HÜBNER, OF VIENNA, AUSTRIA-HUNGARY.

STOP AND AUTOMATIC CUT-OFF VALVE.

SPECIFICATION forming part of Letters Patent No. 751,666, dated February 9, 1904.

Application filed December 22, 1902. Serial No. 136,276. (No model.)

*To all whom it may concern:*

Be it known that we, ISIDOR MAYER and JOSEF HÜBNER, subjects of the Emperor of Austria-Hungary, both residing at XIX 6 Muthgasse 64, Vienna, Austria-Hungary, have invented certain new and useful Improvements in Stop and Automatic Cut-Off Valves; and we do hereby declare the following to be a full, clear, and exact description of the invention, such as will enable others skilled in the art to which it appertains to make and use the same.

In many instances the automatic cut-off valves acting in case of pipe fracture are seated on spindles, on which they slide. In addition such valves are frequently provided with raising devices which are actuated from the outside and are intended to prevent the automatic cut-off valves from sticking to their spindles when becoming heated; but the raising of the self-closing valve is left to the discretion of the attendant, and experience has shown that it is frequently neglected. In consequence of such neglect, however, it may easily happen that in the case of a pipe bursting the self-closing valve will not close properly, either because it sticks to its spindle on account of having become heated or because the lifting-lever has become fixed.

The object of this invention is to obviate such disadvantages.

Figures 1 to 4 of the drawings show in vertical section four different forms of this device applied to cut-off valves which act in the case of pipe fracture.

The distinguishing feature of the invention is the arrangement of a mechanical connection of any suitable kind between the stop-valve, constructed in combination with the automatic cut-off valve, which acts in the case of a pipe fracture and the automatic valve proper A or its spindle D in such a manner that every time the stop-valve is opened or closed the relative positions of the valve A and its spindle D are compulsorily changed. Further, whenever this occurs the spindle N, which serves as a transmission device from the outside to the inside of the valve-casing, is turned in its seating, which is usually constructed as a stuffing-box, a movement which also serves to prevent the spindle sticking or becoming fixed in its seating.

Figure 1:
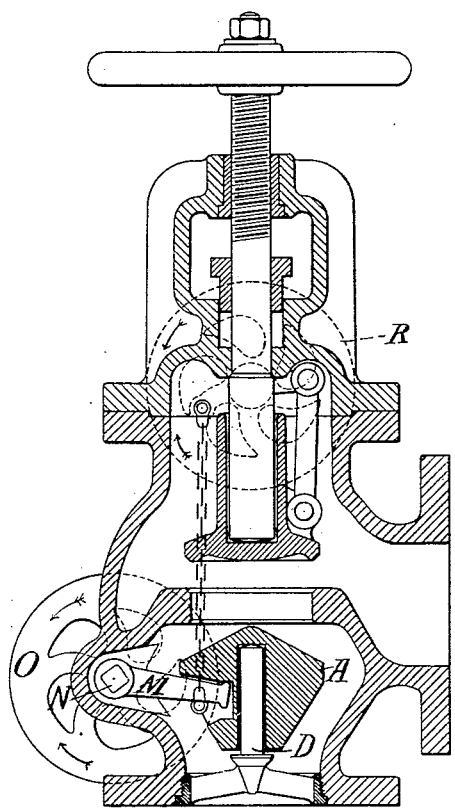
Figure 3:
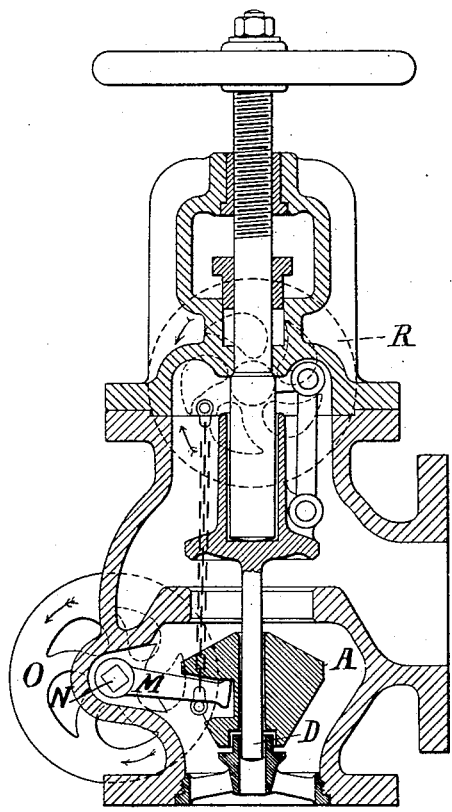
Figure 2:
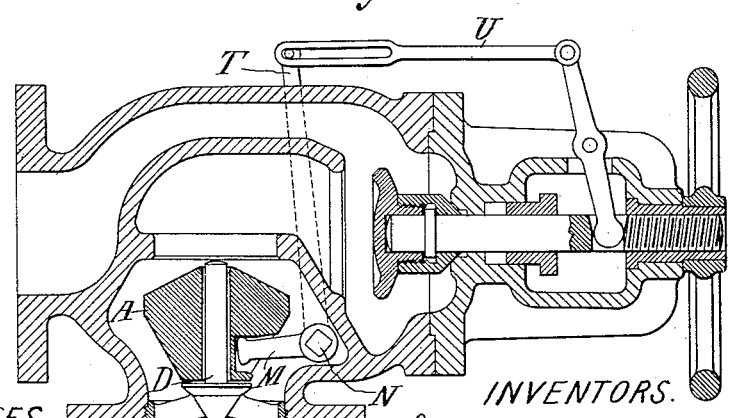

The mechanical connection between the stop-valve and the valve-body A or its spindle D can of course be effected in many different ways. The annexed drawings illustrate, for instance, four different methods of doing so. The characteristic connection between the stop-valve and the automatic cut-off valve A consists, as shown in Figs. 1 and 3, of a chain; as shown in Fig. 2, of a tension-rod, and in Fig. 4 of a spindle D, which is directly connected with the stop-valve. When the stop-valve is in the open position, the valve-cone can be raised or lowered in the usual manner by the action of a lever arrangement through the medium of the upper hand-wheel R, seated on the outside of the valve-casing, by turning the wheel in the one or the other direction. (See Figs. 1 to 3.) The cut-off valve A can also be raised or lowered on the lower hand-wheel O by means of the spindle N and lever arrangement M. If the valve be under steam-pressure, this pressure when the stop-valve is opened in consequence of the upward pressure of the valve-cone will induce, by means of the already-mentioned lever-rods, a rotation of the wheel R in one direction, and when the valve is closed and the valve-cone is pressed downward a rotation of the wheel in the other direction. If the two hand-wheels R and O are connected in a suitable manner by means of a chain or a rope, which chain or rope couples them when rotating, (see Figs. 1 and 3,) the automatic cut-off valve will be automatically raised each time the stop-valve is closed, and vice versa. The mutually-connected means for rotating the two hand-wheels R and O are indicated in both figures by pinnated and bipinnated arrows.

While in the method of construction illustrated in Fig. 1 the valve A moves along the absolutely-fixed spindle D, in the modification illustrated in Fig. 3 a lowering of the spindle D, fixed to the cone of the stop-valve, takes place simultaneously with the raising of the valve A, and vice versa. In the modification represented in Fig. 2 the chain S is replaced by a divertible tension-rod U, arranged on the lever T, which induces a similar sliding movement of the valve A in the same direction as described above.

Figure 4:
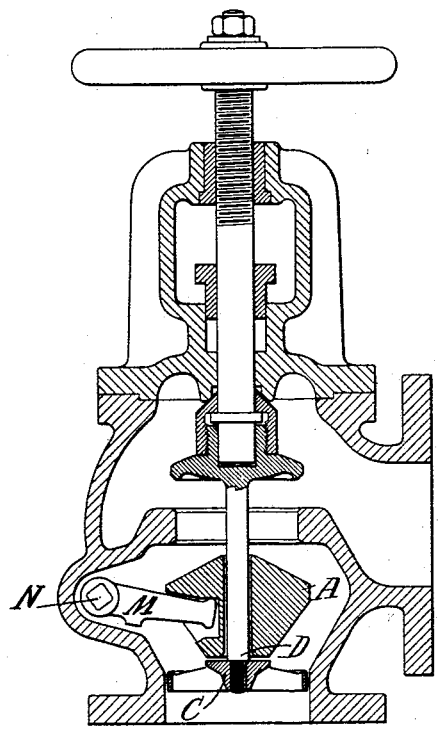

In Fig. 4, which illustrates an arrangement similar to that in Fig. 3, the chain S is omitted and the spindle D, formed in one piece with the cone of the stop-valve, is fixed by means of screws to the socket C, which is guided within the valve-casing by means of ribs and a ring. In this case the spindle D moves in the interior of the valve A, which latter is prevented from being simultaneously lowered beyond a certain extent by the lever M coming against the valve-casing. In every instance the working position of the stop-valve does not interfere with the sliding of the valve A against its seat, which occurs in the case of a pipe fracture, this sliding being permitted at once by the loose chain connection, Figs. 1 and 3, the slot at the end of the tension-rod U, Fig. 2, or the spindle D, Fig. 4; but it might occasionally happen that in consequence of becoming heated a considerable amount of frictional resistance may occur at the seat of the spindle N, which supports the lifting-lever M, which resistance may be overcome when the sliding device is actuated, but still might possibly interfere with the free raising of the automatic valve A at the moment of a pipe fracture. For the purpose of entirely obviating this danger, which certainly is but rarely to be expected, we have made the hollow part of the automatic valve A, as seen in all the figures, in which the lifting-lever M engages, larger, in consequence of which arrangement a slot or free space is left beneath the head of the lever M to the extent of the height of which space the valve A is raised at the moment of the pipe fracture without meeting with any resistance. When the valve-body A has been raised so far, it is already so near its seat that the dynamic pressure of the outflowing vapors, which by this time has become considerable, presses the valve A forcibly against its seat and easily and surely overcomes any resistance offered at the seat of the spindle N by forcibly carrying along the lever M.

The above-described arrangement insures under all working conditions the accurate shutting-off movement of the valve-body A.

The various forms of the new device, which are illustrated in the accompanying drawings, show that the constructive details of the mechanical connection between the stop-valve, on the one hand, and the cut-off valve A or the spindle D, or both together, on the other hand, are without importance as regards the carrying out of the invention. The principal point is the arrangement of a mechanical connection of such a kind so that simultaneously with the moving of the stop-valve the movement of the cut-off valve is compulsorily, and therefore reliably, effected.

What we claim, and desire to secure by Letters Patent, is—

1. The combination with a stop-valve, a guide-spindle mounted in the valve-casing, and an isolating or cut-off valve mounted on the spindle and adapted to close automatically in case of pipe fracture, of levers mounted in the valve-casing adjacent to the valves, means for connecting the levers with the valve-cones, and a flexible coupling connecting the levers to each other, substantially as described.

2. The combination with a stop-valve, a guide-spindle mounted in the valve-casing, and an isolating or cut-off valve mounted on the spindle and adapted to close automatically in case of pipe fracture, of levers mounted in the casing and engaging the valve with their inner ends, and a slotted rod connecting the outer ends of the levers, substantially as described.

3. The combination with a stop-valve and a depending guide-spindle fixed to the stop-valve, of a cut-off valve loosely mounted on the said spindle, and a lever-arm engaging the cut-off valve and acting as a stop to limit the downward movement of the cut-off valve, substantially as described.

4. The combination with a stop-valve and a guide-spindle, of an automatic isolation or cut-off valve loosely mounted on said spindle and having a lateral elongated slot or opening, a lever-arm engaging in said slot but having sufficient play in the slot to enable the valve to rise toward its seat independently of the lever and means for operating said lever by hand, substantially as described.

In testimony whereof we have affixed our signatures in presence of two witnesses.

ISIDOR MAYER.
JOSEF HÜBNER.

Witnesses:
ALVESTO S. HOGUE,
AUGUST FUGGER.